US012143534B2

(12) United States Patent
Naidu et al.

(10) Patent No.: US 12,143,534 B2
(45) Date of Patent: Nov. 12, 2024

(54) CHAT BOT ASYNCHRONOUS AGENT ESCALATION

(71) Applicant: Walmart Apollo, LLC, Bentonville, AR (US)

(72) Inventors: Navin Naidu, Dublin, CA (US); Phani Ram Sayapaneni, Sunnyvale, CA (US); Ashish Kumar Vishwakarma, Navi Mumbai (IN); Venkata Naga Vamsi Krishna Nandanavanam, Newark, CA (US); Shankar Bhargava, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 35 days.

(21) Appl. No.: 17/589,312

(22) Filed: Jan. 31, 2022

(65) Prior Publication Data

US 2022/0232126 A1 Jul. 21, 2022

Related U.S. Application Data

(63) Continuation-in-part of application No. 17/152,671, filed on Jan. 19, 2021, now Pat. No. 11,496,421.

(51) Int. Cl.
*H04L 51/02* (2022.01)
*H04L 51/046* (2022.01)
*H04M 3/523* (2006.01)

(52) U.S. Cl.
CPC ............ *H04M 3/523* (2013.01); *H04L 51/02* (2013.01); *H04L 51/046* (2013.01)

(58) Field of Classification Search
CPC ............................ H04L 51/02; H04L 51/046
See application file for complete search history.

(56) References Cited

U.S. PATENT DOCUMENTS 6,279,029 B1 8/2001 Sampat et al.
8,275,117 B2 9/2012 Huet et al.
(Continued)

OTHER PUBLICATIONS

Ahmad, A., "Build a Smarter Chatbot with Semantic Search," Accessed on Dec. 21, 2021 at https://towardsdatascience.com/build-a-smarter-chatbot-with-semantic-search-323c9a77a31d (9 pgs) Aug. 20, 2021.

(Continued)

*Primary Examiner* — Ryan J Jakovac
(74) *Attorney, Agent, or Firm* — BRYAN CAVE LEIGHTON PAISNER LLP

(57) ABSTRACT

A system comprising one or more processors and one or more non-transitory computer-readable media storing computing instructions that, when executed on the one or more processors perform: receiving, by a chat bot and from a user, an indication to talk to a live agent; calling, by the chat bot, an automatic call distribution server to initiate a live-agent session for the user; storing metadata for the live-agent session in a distributed table and a distributed queue; pulling, from an automatic call distribution connector, one or more messages from a conversation between the user and the chat bot based on the metadata; and connecting the live agent to the user in the live-agent session, wherein the user communicates with the live agent in the live-agent session through a same interface for the chat bot. Other embodiments are disclosed.

20 Claims, 10 Drawing Sheets

(56) References Cited

U.S. PATENT DOCUMENTS

| | | |
|---|---|---|
| 8,762,316 B2 | 6/2014 | Jerram et al. |
| 9,471,638 B2 | 10/2016 | Roytman et al. |
| 10,038,787 B2 * | 7/2018 | Tamblyn ................. H04M 3/54 |
| 10,645,225 B1 | 5/2020 | Stoops et al. |
| 10,917,522 B2 | 2/2021 | Segalis et al. |
| 11,017,268 B2 | 5/2021 | Kansal et al. |
| 2005/0213743 A1 * | 9/2005 | Huet ...................... G06Q 10/10 |
| | | 379/265.09 |
| 2021/0256417 A1 * | 8/2021 | Kneller ............... G10L 15/1815 |
| 2021/0312399 A1 * | 10/2021 | Asokan ............... G10L 15/1815 |
| 2022/0150188 A1 * | 5/2022 | Cotner ................... H04L 51/02 |

OTHER PUBLICATIONS

Azoff, Michael, "Ovum Decision Matrix: Selecting an Intelligent Virtual Assistant Solution, 2020-21", Ovum, Dec. 17, 2019, pp. 1-37. Dec. 17, 2019.

Klopfenstein, Lorenz Cuno et al., "The Rise of Bots: A Survey of Conversational Interfaces, Patterns, and Paradigms", Department of Pure and Applied Sciences Piazza della Repubblica 13, 61029 Urbino University of Urbino "Carlo Bo", Italy, Found at DOI: http://dx.doi.org/10.1145/3064663.3064672, 11 pages. Jun. 2017.

* cited by examiner

CHAT BOT ASYNCHRONOUS AGENT ESCALATION

CROSS-REFERENCE TO RELATED APPLICATIONS

This application is a continuation-in-part of U.S. application Ser. No. 17/152,671, filed Jan. 19, 2021, and is incorporated herein by reference it its entirety.

TECHNICAL FIELD

The disclosed generally relates to chat bot asynchronous agent escalation.

BACKGROUND

Conversational assistants have been utilized for applications like online shopping, online customer service, etc. An existing online conversational assistant uses a synchronous communication model, e.g. based on hypertext transfer protocol secure (https) protocol, to exchange messages with a client device and between different components of the conversational assistant. Based on the synchronous communication model, the client device communicates synchronously with the online conversational assistant. That is, after the client device sends a request to the conversational assistant, the client device will wait until a response is returned. The client device is prevented from performing any other operations with respect to the conversational assistant until the response is received.

The synchronous communication model is not suitable for many online applications with asynchronous users. For example, when the client device is an intelligent virtual assistant (IVA) or an intelligent personal assistant (IPA), which often has a response time of 5~10 seconds, a response from the IVA or IPA has to be provided within 5~10 seconds after a voice or text message input by a user. But when the user is an asynchronous user, or operates as an asynchronous client to the online conversational assistant, the user can send multiple messages without waiting for the online conversational assistant to reply. Because there may be many other actions at the online conversational assistant before replying to the asynchronous user, a response may be provided by the client device several minutes after an input from the asynchronous user, which is way longer than the response time of 5~10 seconds of an existing IVA or IPA. As such, a conversational assistant that can only support synchronous users or clients has a limited capability of automated online conversations.

Sometimes, while chatting with a chat bot, a user would prefer be connected to a live agent.

SUMMARY

The embodiments described herein are directed to a system and method for exchanging asynchronous messages with a client device to facilitate an automated conversation with a user associated with the client device. In addition to or instead of the advantages presented herein, persons of ordinary skill in the art would recognize and appreciate other advantages as well.

In accordance with various embodiments, exemplary systems may be implemented in any suitable hardware or hardware and software, such as in any suitable computing device.

In some embodiments, a system for facilitating automated conversations over a network includes a computing device operably connected to a database, and is configured to receive a plurality of incoming messages from a first user in an asynchronous manner; and identify a user request associated with the plurality of incoming messages. In these embodiments, the computing device determines that the plurality of incoming messages are all incoming messages that are associated with the user request; processes the plurality of incoming messages together; and generates at least one outgoing message as a response to the user request.

In some embodiments, a method is provided for facilitating automated conversations over a network. The method includes: receiving a plurality of incoming messages from a first user in an asynchronous manner; identifying a user request associated with the plurality of incoming messages; determining that the plurality of incoming messages are all incoming messages that are associated with the user request; processing the plurality of incoming messages together; and generating at least one outgoing message as a response to the user request.

In yet other embodiments, a non-transitory computer readable medium having instructions stored thereon is provided. The instructions, when executed by at least one processor, cause a device to perform operations comprising: receiving a plurality of incoming messages from a first user in an asynchronous manner; identifying a user request associated with the plurality of incoming messages; determining that the plurality of incoming messages are all incoming messages that are associated with the user request; processing the plurality of incoming messages together; and generating at least one outgoing message as a response to the user request.

Some embodiments can include a system one or more processors; and one or more non-transitory computer-readable media storing computing instructions that, when executed on the one or more processors, cause the one or more processors to perform certain acts. The acts can include receiving, by a chat bot and from a user, an indication to talk to a live agent. The acts also can include calling, by the chat bot, an automatic call distribution server to initiate a live-agent session for the user. The acts additionally can include storing metadata for the live-agent session in a distributed table and a distributed queue. The acts also can include pulling, from an automatic call distribution connector, one or more messages from a conversation between the user and the chat bot based on the metadata stored in the distributed table and the distributed queue. The acts further can include connecting the live agent to the user in the live-agent session using the automatic call distribution connector. The user can communicate with the live agent in the live-agent session through a same interface for the chat bot.

A number of embodiments can include a method being implemented via execution of computing instructions configured to run at one or more processors and stored at one or more non-transitory computer-readable media. The method can include receiving, by a chat bot and from a user, an indication to talk to a live agent. The method also can include calling, by the chat bot, an automatic call distribution server to initiate a live-agent session for the user. The method additionally can include storing metadata for the live-agent session in a distributed table and a distributed queue. The method also can include pulling, from an automatic call distribution connector, one or more messages from a conversation between the user and the chat bot based on the metadata stored in the distributed table and the distributed queue. The method further can include connecting the live agent to the user in the live-agent session using the automatic call distribution connector. The method can communicate with the live agent in the live-agent session through a same interface for the chat bot.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DESCRIPTION OF EXAMPLES OF EMBODIMENTS

Figure 1:
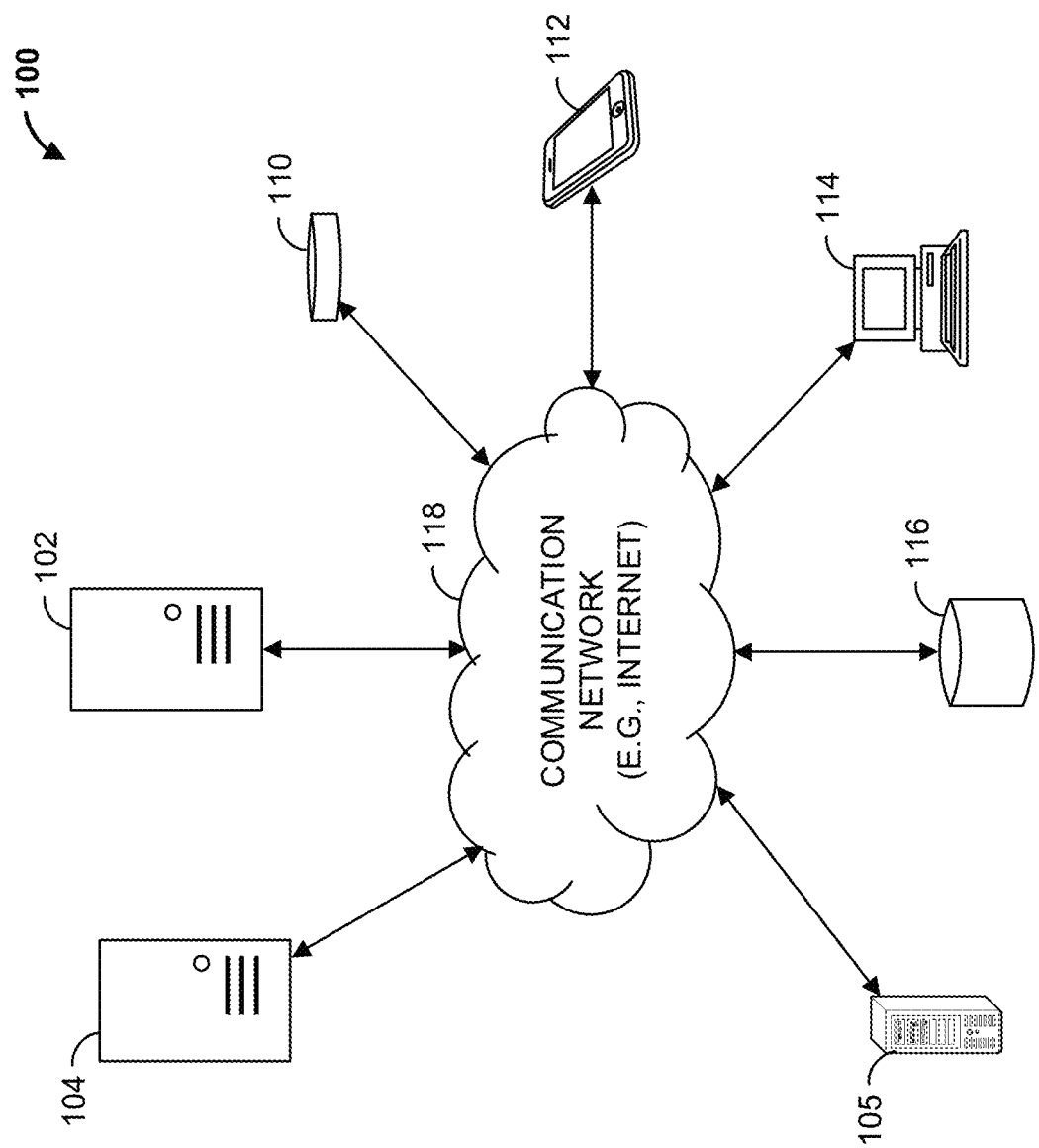
FIG. 1 is a block diagram of an exemplary communication system used to render automated online conversations, in accordance with some embodiments of the present teaching.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an exemplary communication system 100 used to render automated online conversations, in accordance with some embodiments of the present teaching. As shown in FIG. 1, the communication system 100 includes an asynchronous conversational computing device 102 (e.g., a server, such as an application server), a web server 104, an agent tool system 105, a database 116, and multiple customer computing devices 110, 112, 114 operatively coupled over a network 118.

The asynchronous conversational computing device 102, the web server 104, the agent tool system 105, and the multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, or through the communication network 118.

In some examples, the asynchronous conversational computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, the asynchronous conversational computing device 102, the web server 104 and the agent tool system 105 are operated by a retailer, and multiple customer computing devices 112, 114 are operated by customers of the retailer.

Although FIG. 1 illustrates three customer computing devices 110, 112, 114, the communication system 100 can include any number of customer computing devices 110, 112, 114. Similarly, the communication system 100 can include any number of workstation(s) (not shown), asynchronous conversational computing devices 102, web servers 104, agent tool systems 105 and databases 116.

The asynchronous conversational computing device 102 is operable to communicate with databases 116 over the communication network 118. For example, the asynchronous conversational computing device 102 can store data to, and read data from, databases 116. Databases 116 may be remote storage devices, such as a cloud-based server, a disk (e.g., a hard disk), a memory device on another application server, a networked computer, or any other suitable remote storage. Although shown remote to the asynchronous conversational computing device 102, in some examples, databases 116 may be a local storage device, such as a hard drive, a non-volatile memory, or a USB stick. The asynchronous conversational computing device 102 may store data from workstations or the web server 104 into the database 116. In some examples, storage devices store instructions that, when executed by the asynchronous conversational computing device 102, allow the asynchronous conversational computing device 102 to have automated conversations with online users. In accordance with some embodiments, the asynchronous conversational computing device 102 can exchange asynchronous messages with any of the customer computing devices 110, 112, 114 over the communication network 118, to facilitate the automated conversations. In accordance with other embodiments, the asynchronous conversational computing device 102 can exchange both synchronous messages and asynchronous messages with any of the customer computing devices 110, 112, 114 over the communication network 118, to facilitate the automated conversations. In accordance with other embodiments, the asynchronous conversational computing device 102 can exchange synchronous messages with some customer computing devices, and exchange asynchronous messages with other customer computing devices, to facilitate the automated conversations with the customer computing devices or client devices, depending on whether each client device corresponds to a synchronous client or an asynchronous client.

The agent tool system 105 may be triggered by an agent escalation process at the asynchronous conversational computing device 102, when a human agent is desired to take over the conversation with a user from the asynchronous conversational computing device 102. In accordance with some embodiments, the agent tool system 105 may be a remote system or a local system coupled to the asynchronous conversational computing device 102. The agent tool system 105 may include an automatic chat distribution (ACD) function that enables a group of human agents, to handle a high volume of inbound calls or incoming messages. The ACD can manage agent workload more effectively by intelligently routing conversation requests and balancing the workload among the pool of available agents.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

Figure 2:
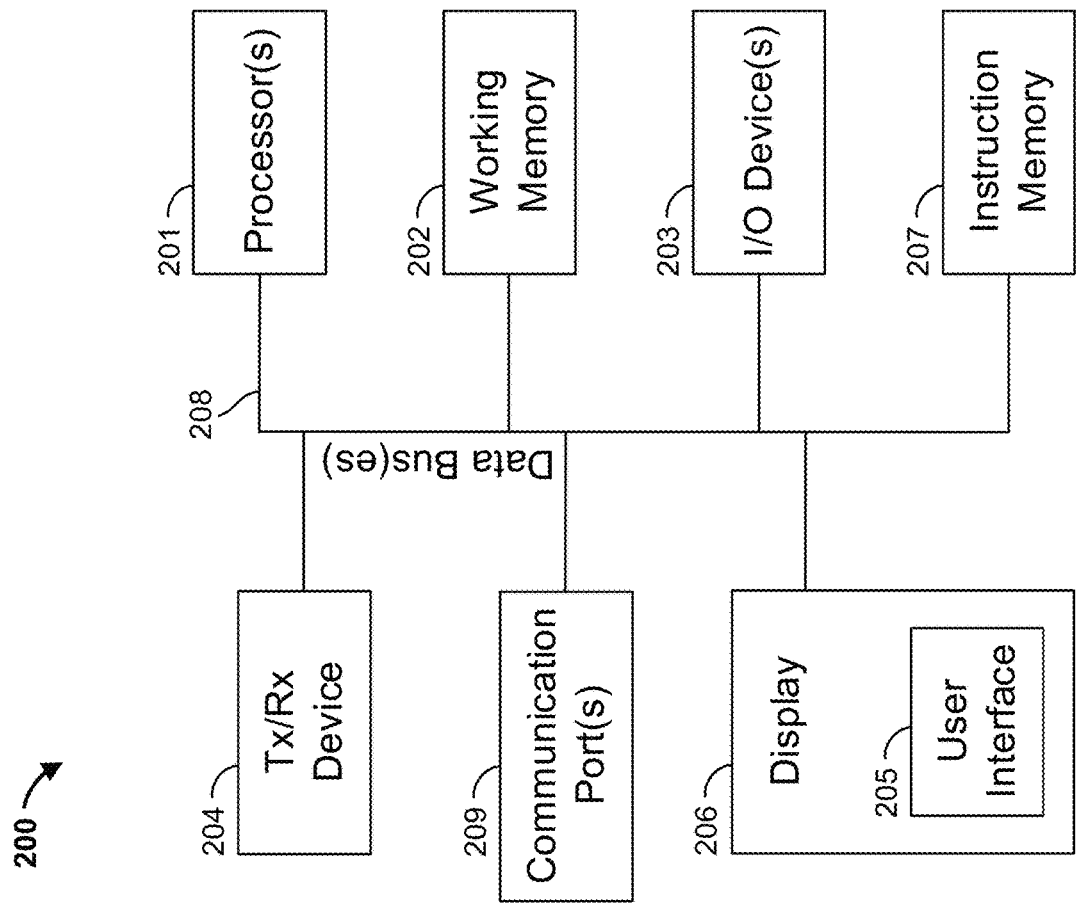
FIG. 2 is a block diagram of the asynchronous conversational computing device of the communication system of FIG. 1, in accordance with some embodiments of the present teaching.

FIG. 2 illustrates an example computing device 200. The asynchronous conversational computing device 102, the web server 104, the agent tool system 105, the voice assistant device 110, the mobile user computing device 112 and/or the user desktop computing device 114 may include the features shown in FIG. 2. For the sake of brevity, FIG. 2 is described relative to the asynchronous conversational computing device 102. It should be appreciated, however, that the elements described can be included, as applicable, in the web server 104, the agent tool system 105, the voice assistant device 110, the mobile user computing device 112 and/or the user desktop computing device 114.

As shown in FIG. 2, the asynchronous conversational computing device 102 can be a computing device 200 that may include one or more processors 201, a working memory 202, one or more input/output devices 203, an instruction memory 207, a transceiver 204, one or more communication ports 209, and a display 206, all operatively coupled to one or more data buses 208. The data buses 208 allow for communication among the various devices. The data buses 208 can include wired, or wireless, communication channels.

The one or more processors 201 can include one or more distinct processors, each having one or more processing cores. Each of the distinct processors can have the same or different structures. The one or more processors 201 can include one or more central processing units (CPUs), one or more graphics processing units (GPUs), application specific integrated circuits (ASICs), digital signal processors (DSPs), and the like.

The one or more processors 201 can be configured to perform a certain function or operation by executing code, stored on the instruction memory 207, embodying the function or operation. For example, the one or more processors 201 can be configured to perform one or more of any function, method, or operation disclosed herein.

The instruction memory 207 can store instructions that can be accessed (e.g., read) and executed by the one or more processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

The one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during the operation of the asynchronous conversational computing device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning algorithm training data.

The display 206 can display a user interface 205. User interfaces 205 can enable user interaction with the asynchronous conversational computing device 102. In some examples, a user can interact with the user interface 205 by engaging input-output devices 203. In some examples, the display 206 can be a touchscreen, where the user interface 205 is displayed by the touchscreen.

The transceiver 204 allows for communication with a network, such as the communication network 118 of FIG. 1. For example, if the communication network 118 of FIG. 1 is a cellular network, the transceiver 204 may be configured to allow communications with the cellular network. In some examples, the transceiver 204 is selected based on the type of communication network 118 which the asynchronous conversational computing device 102 will be operating in. The processor(s) 201 is operable to receive data from, or send data to, a network, such as the communication network 118 of FIG. 1, via the transceiver 204.

Figure 3:
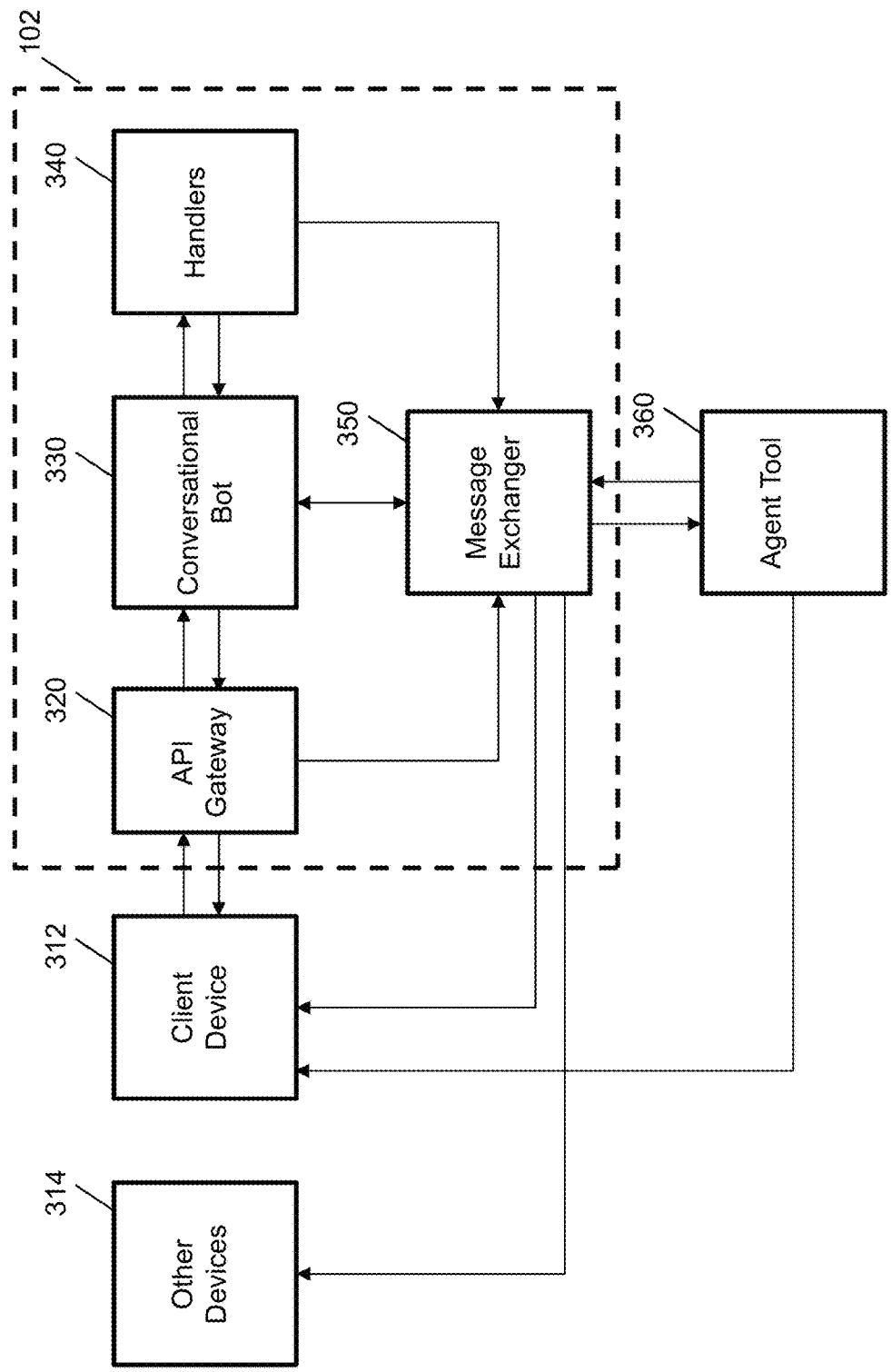
FIG. 3 is a block diagram illustrating examples of various portions of the asynchronous conversational computing device in the communication system of FIG. 1, in accordance with some embodiments of the present teaching.

FIG. 3 is a block diagram illustrating examples of various portions of the asynchronous conversational computing device 102 in the communication system 100 of FIG. 1, in accordance with some embodiments of the present teaching. As shown in FIG. 3, the asynchronous conversational computing device 102 may include an application programming interface (API) gateway 320, a conversational bot 330, one or more handlers 340, and a message exchanger 350. The asynchronous conversational computing device 102 interacts with a client device 312, which may be implemented as any of the customer computing devices 110, 112, 114 in FIG. 1.

The client device 312 may be an input device that can capture a user input of a user, or an adapter interfacing with such an input device. The user input may be in form of utterance or text. When the user is a synchronous client, e.g. based on a user identity (ID) of the user, the client device 312 can pass user messages to the asynchronous conversational computing device 102 over https and receive a response synchronously. For example, the API gateway 320 may receive user messages from the client device 312, and resolve the user ID and application ID associated with each user message. In one embodiment, the API gateway 320 enforces consumer and resource level policies, serving as a bridge between the client device 312 and the conversational bot 330.

The conversational bot 330 may be a conversational artificial intelligence (AI) platform that can process the user messages and generate corresponding responses. In one embodiment, the user messages are processed based on a natural language understanding (NLU) model. In various embodiments, the conversational bot 330 can: determine and classify user intents, recognize named entities, manage dialogs, and execute conversation related tasks, based on e.g. a question-answer system and/or a retail knowledge database.

In one example, a user is using a voice command (e.g. "find the new smart phones with best review scores for me," "add this laptop into my shopping cart") for online shopping at a retailer, via a voice assistant device. To reduce friction for clients, the conversational bot 330 can coordinate with the one or more handlers 340. Each handler 340 can have a function like search or personalization. By deeply integration with the conversational bot 330, a handler 340 can play a key role in: returning the right products to the user's voice queries, understanding the user's query context, and/or customizing the search results and interactive responses. The handler 340 may respond to incoming http traffic synchronously. If any asynchronous action is needed, the one or more handlers 340 can take care of it without noticing the conversational bot 330.

In some embodiments, the API gateway 320 may determine that the user is an asynchronous client, e.g. based on a user identity (ID) of the user. Then the API gateway 320 can pass user messages from the client device 312 to the message exchanger 350 directly. The message exchanger 350 may be a message exchange engine that can act as a client for the conversational bot 330 for all asynchronous use cases. For example, the message exchanger 350 can aggregate all asynchronous messages associated with a same request from a user, and send the aggregated messages to the conversational bot 330 synchronously for processing and response generation. When a handler 340 is involved, the handler 340 may perform asynchronous actions, and forward asynchronous responses and multicast response payloads to the message exchanger 350 directly without going through the conversational bot 330.

In various embodiments, the message exchanger 350 may send the outgoing messages, or response messages to different devices. In one example, after receiving an incoming message from the client device 312, the message exchanger 350 can send an outgoing message as a response to the client device 312 which is an asynchronous client. In another example, after receiving an incoming message from the client device 312, the message exchanger 350 can send an outgoing message as a response to other devices 314 linked to or associated with the asynchronous client, e.g. as indicated in the outgoing message. For example, when a same user account is associated with multiple devices, a user can input a request through a first device of the user to trigger an action or response sent to: the first device of the user, and/or another device of the user.

In some embodiments, the message exchanger 350 may start an agent escalation process to initiate agent escalation at an agent tool 360, e.g. based on a flavor of the customer relationship management (CRM) solution related to the incoming and outgoing messages of the message exchanger 350. The agent tool 360 may be implemented according to the agent tool system 105 in FIG. 1. After the agent escalation starts, the agent tool 360 can serve as a bridge between the user and a human agent. In some embodiments, the agent tool 360 can interact with the user directly through the client device 312 without involvement of or notice to the asynchronous conversational computing device 102. The agent tool 360 can send the conversation history between the user and the human agent to the message exchanger 350 later. In other embodiments, the agent tool 360 can communicate with the user through the message exchanger 350, which can automatically record the conversation between the user and the human agent, for the conversational bot 330 to consume it offline.

According to various embodiments, the conversational bot 330 can serve as a conversational AI platform to coordinate between the client device 312 and the one or more handlers 340 based on channel and domain specific logic. The core services of the platform can be completely decoupled from the complexities of executing user intents and nuances of surfacing messages and actions to the user. The message exchanger 350 here may serve as a message broker that orchestrates receipt and delivery of messages across different entities in the asynchronous conversational computing device 102, to handle asynchronous clients and actions on the platform.

An asynchronous client can send multiple messages without waiting for the asynchronous conversational computing device 102 to reply. Many text-based clients are asynchronous clients. Asynchronous actions are actions, e.g. messages, originating from the asynchronous conversational computing device 102, possibly in response to a user request made sometime before. For example, after a user inputs a message like "I want to know about my order" via the client device 312, the user immediately inputs other messages like "my order ID is XXX" and "my email ID is YYY." All the three user messages are associated with a same user request about checking order status. As such, the three user messages should be processed together for generating a response, which is not supported by a synchronous communication system without the message exchanger 350. For example, in a synchronous communication system based on https, after the user inputs "I want to know about my order," the system will ask for information like user ID and email ID, even if the user is already typing the information.

As discussed above, the message exchanger 350 can support response multicasting, to send response to a different device than the one that initiated it, and possibly to send responses to multiple devices in response to one command.

The message exchanger 350 can also support agent handoff to toggle between conversational bot and human agent, on-demand or adaptively. The message exchanger 350 can manage handoff and context sharing between the conversational bot and human agent. For example, after the user inputs "I want to know about my order" and "my order ID is XXX," the bot may reply "your order has been delivered." Then if the user inputs "but I did not receive it," the bot will understand that the user request is beyond the bot's capability to handle, and automatically determine to handoff to a human agent, based on e.g. user information, business category of the user request, handoff technology to be used, and other context information of the conversation. The message exchanger 350 also supports an on-demand bi-directional conversation replay, to allow human agents and the asynchronous conversational computing device 102 to consume each other's conversations (with a user) retroactively, e.g. conversations days ago.

In some embodiments, the asynchronous conversational computing device 102 can support online analytics, e.g. analytics on streaming conversational data subscribed for arbitrary ETL (extract, transform, load) workloads. In some embodiments, the asynchronous conversational computing device 102 can support both synchronous and asynchronous clients. For synchronous clients, the architecture of the asynchronous conversational computing device 102 may be optimized for lowering latency. Asynchronous clients are tolerant of slightly higher latencies, compared to synchronous clients. All asynchronous clients can provide a callback hook to push messages. In some embodiments, agent escalation is used only by asynchronous clients. In some embodiments, the responses have a fixed length for non-streaming conversations.

In some embodiments, the asynchronous conversational computing device 102 is configured to receive at least one incoming message from a first user in an asynchronous manner via the client device 312, and identify a user request associated with the at least one incoming message. Once the asynchronous conversational computing device 102 determines that every incoming message associated with the user request has been received from the first user; the asynchronous conversational computing device 102 processes all incoming messages associated with the user request and received from the first user together and at the same time, e.g. based on a natural language understanding (NLU) model, to generate at least one outgoing message as a response to the user request. When the at least one incoming message comprises a plurality of incoming messages, each of the plurality of incoming messages is received based on a user input of the first user, in form of utterance or text, on a client device associated with a user ID of the first user. The asynchronous conversational computing device 102 can determine whether the first user corresponds to a synchronous client or an asynchronous client based on client information of the first user.

In some embodiments, the client information includes information related to at least one of: a client ID of the client device determined during an on-boarding process of the client device, or the user ID of the first user determined during an on-boarding process of the first user. Each message of the at least one incoming message and the at least one outgoing message may include the client information. The asynchronous conversational computing device 102 can transmit the at least one outgoing message asynchronously to at least one destination, which may comprise at least one of: the client device, an additional device associated with the user ID of the first user, or an additional device associated with a user ID of a second user.

In some embodiments, the at least one destination is determined to include the agent tool 360, based on an indication in the at least one outgoing message. The asynchronous conversational computing device 102 can transmit the at least one outgoing message and a conversation history between the asynchronous conversational computing device 102 and the first user, asynchronously to the agent tool 360. The agent tool 360 may select a human agent to chat with the first user via the agent tool 360 based on the at least one outgoing message and the conversation history.

In some embodiments, the API gateway 320 can also receive a message from a second user; determine that the second user corresponds to a synchronous client based on client information of the second user; and transmit synchronously the message to the conversational bot 330 for processing, where the message is not added into any queue.

Figure 4:
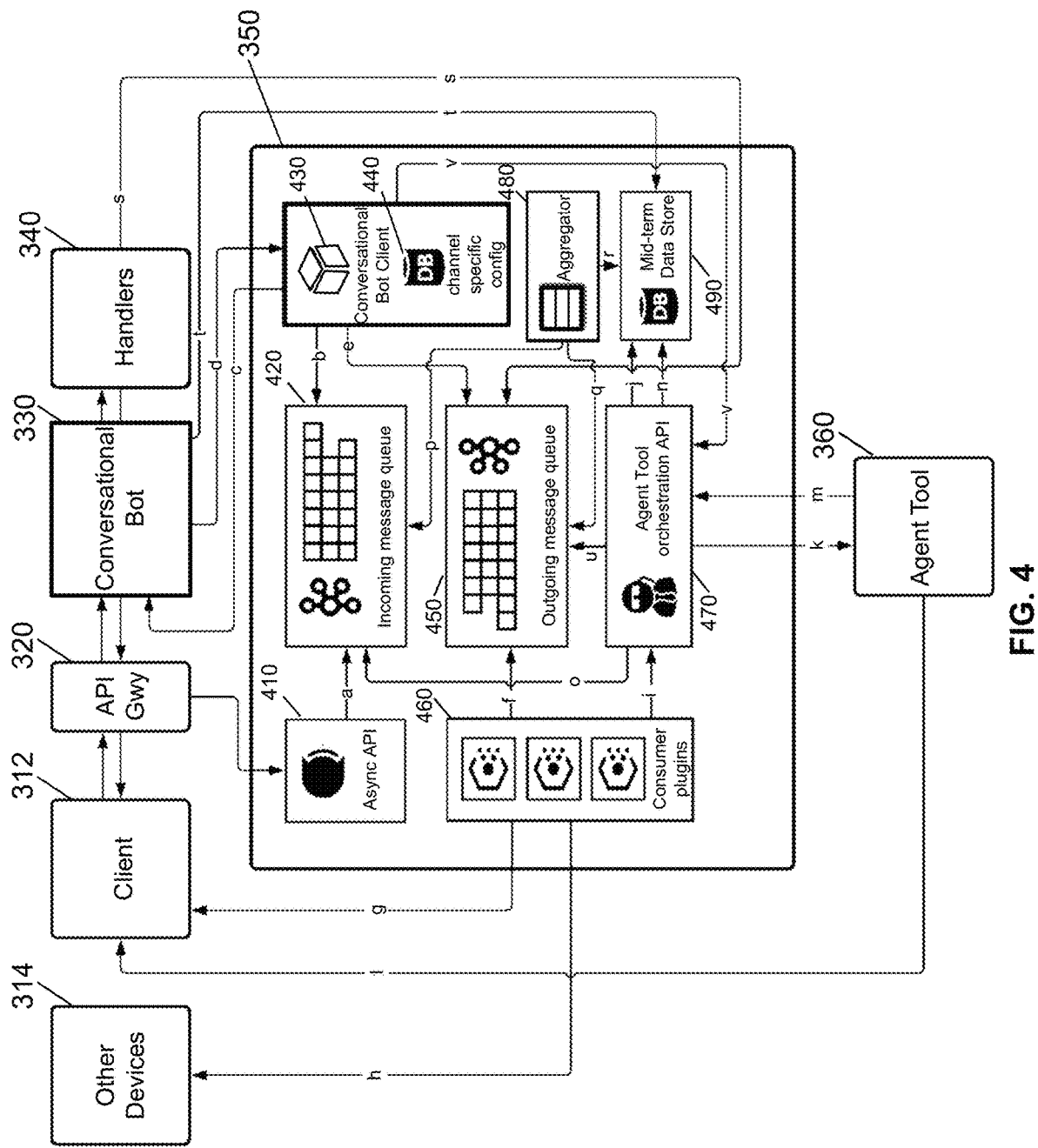
FIG. 4 is a block diagram illustrating examples of various portions of the message exchanger in the asynchronous conversational computing device of FIG. 3, in accordance with some embodiments of the present teaching.

FIG. 4 is a block diagram illustrating examples of various portions of the message exchanger 350 in the asynchronous conversational computing device 102 of FIG. 3, in accordance with some embodiments of the present teaching. As shown in FIG. 4, the message exchanger 350 may include an asynchronous API 410, an incoming message queue 420, a conversational bot client 430 coupled to a channel specific configuration database 440, an outgoing message queue 450, one or more consumer plugins 460, an agent tool orchestration API 470, an aggregator 480, and a midterm data store 490.

The asynchronous API 410 may be a lightweight API that is exposed through an API proxy. In some embodiments, the asynchronous API 410 receives an incoming request from the API gateway 320. The incoming request originated by an asynchronous client includes an asynchronous message, which does not need to be replied immediately. The asynchronous API 410 can add the asynchronous message into the incoming message queue 420, as shown with line a in FIG. 4. The incoming message queue 420 is a message queue that stores all incoming messages that are yet to be sent to the conversational bot 330.

A queue is a collection of entities that are maintained in a sequence and can be modified by the addition of entities at one end of the sequence and the removal of entities from the other end of the sequence. As used herein, when a message is added into a queue, the message is added at one end, called the back, tail, or rear, of the queue; and when a message is extracted or read from a queue, the message is extracted at the other end, called the head or front, of the queue.

In some embodiments, the asynchronous API 410 can reply an acknowledgement (ACK) message as a response, which is not the final response, to the received asynchronous message. The asynchronous API 410 can either be a stand-alone API, or a new route with respect to the conversational bot 330.

The conversational bot client 430 in some embodiments can be a consumer that subscribes to the incoming message queue 420. Based on a channel-specific configuration 440, the conversational bot client 430 can concatenate one or more of the incoming messages for a given user, and calls the conversational bot 330 for processing the message(s). The channel specific configuration database 440 stores information related to how to concatenate or aggregate messages for each combination of channel and domain. A channel here refers to a mechanism a user used to communicate with the conversational bot or the asynchronous conversational computing device 102, by inputting and receiving messages. For example, different channels may mean different types of devices (smartphone, laptop, personal computer, tablet, smart speaker, etc.), or mean different software or app used on a device. A domain here refers to a category of intent of the user by communicating with the conversational bot. For example, domains may include but not limited to: online grocery shopping, customer support, product return, etc.

As shown with line b in FIG. 4, the conversational bot client 430 can extract or read messages for the given user from the incoming message queue 420. In some embodiments, the conversational bot client 430 can determine when to integrate or accumulate the messages, and when to forward the integrated messages to the conversational bot 330 for processing as shown with line c in FIG. 4. For example, the conversational bot client 430 can concatenate the messages for the given user, and call the conversational bot 330 with the concatenated messages, which are wrapped in the request payload to the conversational bot 330.

The conversational bot 330 can generate one or more outgoing messages in response to the integrated or accumulated messages; and transmit the one or more outgoing messages to the conversational bot client 430 as a response shown with line d in FIG. 4. As the conversational bot client 430 can serve as a client to the conversational bot 330, the communications, shown as lines c and d in FIG. 4, between the conversational bot client 430 and the conversational bot 330 may both follow a synchronous communication model.

As shown with line e in FIG. 4, after the conversational bot client 430 receives an outgoing message, the conversational bot client 430 may add the outgoing message into the outgoing message queue 450, which is a message queue that stores all responses from the conversational bot 330 that are yet to be dispatched to their respective destinations.

Each of the one or more consumer plugins 460 may be associated with a corresponding consumer that subscribe to the outgoing message queue 450. Each integration may have its own consumer, that knows how to deal with outgoing messages, e.g. whether to perform agent escalation, callback hook, or multi-cast. For example, consumers like Walmart, Sam's Club may have their own plugins in the consumer plugins 460, to read or extract outgoing messages designated for them, from the outgoing message queue 450, as shown with line f in FIG. 4. For each outgoing message extracted by a corresponding consumer plugin 460, it may be sent to one or more destinations. For example, depending on the integration and contents of the outgoing message, the corresponding consumer plugin 460 may send the outgoing message back to the client device 312 via line g, to other devices 314 via line h, and/or to the agent tool orchestration API 470 via line i for agent escalation, respectively.

In some embodiments, the outgoing message extracted by the consumer plugin 460 includes a flag. The flag, when turned on, indicates that the message is desired to be sent to the agent tool orchestration API 470 for agent escalation.

The agent tool orchestration API 470 may be an API that can be requested to start the agent escalation process. Depending on the flavor of the customer relationship management (CRM) solution, the agent tool orchestration API 470 can act as a message broker between the agent tool 360 and the client device 312. As shown with line j in FIG. 4, the agent tool orchestration API 470 can read conversation history so far for a given user from the mid-term data store 490. The agent tool orchestration API 470 can hand off the conversation with the client to the agent tool 360, possibly with the data collected from via line j. The agent tool orchestration API 470 can push incoming messages from the client to the agent tool 360, as shown with line k in FIG. 4.

In some embodiments, the agent tool 360 may communicate with the user or client directly, for CRM solutions that have this capability, as shown with line l in FIG. 4. In other embodiments, the agent tool 360 may communicate with the user via the agent tool orchestration API 470 and the outgoing message queue 450. As shown with line u in FIG. 4, the agent tool orchestration API 470 may add responses received from the agent tool 360 into the outgoing message queue 450. As shown with line v in FIG. 4, the conversational bot client 430 may send incoming messages directly to the agent tool orchestration API 470, instead of to the conversational bot 330, while the user (on the client device 312) is connected to the human agent.

In some embodiments, the agent tool 360 may be implemented with an automatic chat distribution (ACD), which may be local to the asynchronous conversational computing device 102 or a third party separate from the asynchronous conversational computing device 102. The ACD can execute functions like enqueuing messages, distributing messages with user IDs to different human agents, etc.

After the agent tool 360 finishes conversation with the client, the agent tool 360 notices the agent tool orchestration API 470 that the conversation is complete, as shown with line m in FIG. 4, and can send the conversation history between the human agent and the client back to the platform, e.g. to the agent tool orchestration API 470. In some embodiments, after the agent tool orchestration API 470 receives an offline chat history between the human agent and the client device 312, the agent tool orchestration API 470 may store the chat history into the mid-term data store 490, as shown with line n in FIG. 4. In some embodiments, the agent tool orchestration API 470 can also add the chat history into the incoming message queue 420 for offline ingestion by the conversational bot 330, as shown with line o in FIG. 4. This can provide context message and background knowledge from the human agent to the conversational bot 330, such that a later conversation between the conversational bot 330 and the client device 312 can make use of the background information and does not need to start from fresh.

There may be different flavors of escalation and agent handoff for agent tool integration, according to different embodiments of the present teaching. In one embodiment, the client has complete infrastructure set up, and does not want the message exchanger 350 to know or do anything, during conversation between the client and the human agent. In another embodiment, the client knows CRM solution to use, but needs a middleware, and does not know how the message exchanger 350 fits in. In another embodiment, the client has no agent escalation infrastructure or preference.

The aggregator 480 can serve as a consumer that subscribes to both the incoming message queue 420 and the outgoing message queue 450, and pipes the data to the mid-term data store 490. For example, the aggregator 480 can extract and consume incoming and outgoing messages from the incoming message queue 420 and the outgoing message queue 450, respectively shown as lines p and q in FIG. 4. The aggregator 480 can aggregate and sort the extracted messages based on time stamps, and send the sorted messages to the mid-term data store 490. As shown with line r in FIG. 4, the aggregator 480 can store incoming and outgoing messages chronologically into the mid-term data store 490.

The mid-term data store 490 may be a real time database that records all conversations (synchronous, asynchronous, or agent) for a limited time period, e.g. several hours or several days. The mid-term data store 490 can serve as one stop shop for all real time conversion data, for online or offline analytics. The mid-term data store 490 may or may not be a message queue itself.

The handlers 340 may be APIs with services like searching or looking up, and can generate and add asynchronous responses directly into the outgoing message queue 450, as shown with line s in FIG. 4, without going through the conversational bot 330. As shown with line t in FIG. 4, the conversational bot 330 may send synchronous conversation turns that normally bypass other components of the message exchanger 350, and possibly logs, into the mid-term data store 490.

In some embodiments, before a client starts a conversation, a client ID (or user ID, consumer ID) and a private key may be assigned to the conversation to associate the conversation to a corresponding end point. When the client ID indicates that the client is a synchronous client, the incoming message from the client device 312 is forwarded to the conversational bot 330 by the API gateway 320; and when the client ID indicates that the client is an asynchronous client, the incoming message from the client device 312 is forwarded to the asynchronous API 410 by the API gateway 320. That is, routing of a message from a client is determined at client level during an on-boarding process of the client device 312.

In some embodiments, if one client switches between synchronous and asynchronous use cases on-demand, the asynchronous API 410 can have a scheme to change its routing service accordingly to determine whether to go to the conversational bot 330 or the asynchronous API 410. That is, routing of a message from a client may also be determined at message level.

The client device 312 and the other devices 314 may be linked to a same user or same client, with a same user account. For example, after a user logs in an application on one device, the same user account or user ID can be used to link other devices, e.g. via a quick response (QR) code, to the logged-in device. The account linking can be performed during an on-boarding process of the client device 312 and the other devices 314 onto the asynchronous conversational computing device 102.

As such, after the API gateway 320 receives a plurality of incoming messages from the client device 312 associated with a first user, the API gateway 320 can determine whether the first user corresponds to a synchronous client or an asynchronous client, based on client information of the first user, where the client information may be determined during an on-boarding process of the client device 312 on the asynchronous conversational computing device 102. The asynchronous API 410 can add each of the plurality of incoming messages into the incoming message queue 420 storing all asynchronous messages yet to be processed, e.g. based on the NLU model, upon a determination that the first user corresponds to an asynchronous client; and transmit an acknowledgement (ACK) message to the first user. The conversational bot client 430 can extract the plurality of incoming messages associated with the user request from the incoming message queue 420, based on a domain configuration and a channel configuration associated with the user request; and transmit synchronously the plurality of incoming messages to the conversational bot 330, such that the plurality of incoming messages are processed together at the conversational bot 330 to generate the at least one outgoing message; and receive synchronously the at least one outgoing message from the conversational bot 330. The conversational bot client 430 can add the at least one outgoing message into the outgoing message queue 450 storing all responses from the conversational bot 330 and yet to be dispatched.

In some embodiments, the one or more consumer plugins 460 can extract the at least one outgoing message including the client information from the outgoing message queue 450; and determine at least one destination for the at least one outgoing message based on the client information. As discussed above, the at least one destination comprises at least one of: the client device 312, an additional device 314 associated with the user ID of the first user, an additional device 314 associated with a user ID of a second user, or the agent tool 360 for agent escalation with a selected human agent.

In some embodiments, after agent escalation, the message exchanger 350 can receive an additional incoming message from the first user; add the additional incoming message into the incoming message queue 420; extract the additional incoming message from the incoming message queue 420; and transmit the additional incoming message to the agent tool 360, which forwards the additional incoming message to the selected human agent. The agent tool 360 may send a response from the human agent to the first user, either directly to the client device 312 or via the outgoing message queue 450 to destination(s) indicated in the outgoing messages.

In some embodiments, the agent tool orchestration API 470 can receive a chat history between the human agent and the first user from the agent tool 360, and store the chat history into the mid-term data store 490. In some embodiments, the agent tool orchestration API 470 can also add the chat history into the incoming message queue 420 for offline ingestion. In some embodiments, the aggregator 480 can read and sort messages from both the incoming message queue 420 and the outgoing message queue 450, based on time stamps of the messages; and store the messages into the mid-term data store 490.

Figure 5:
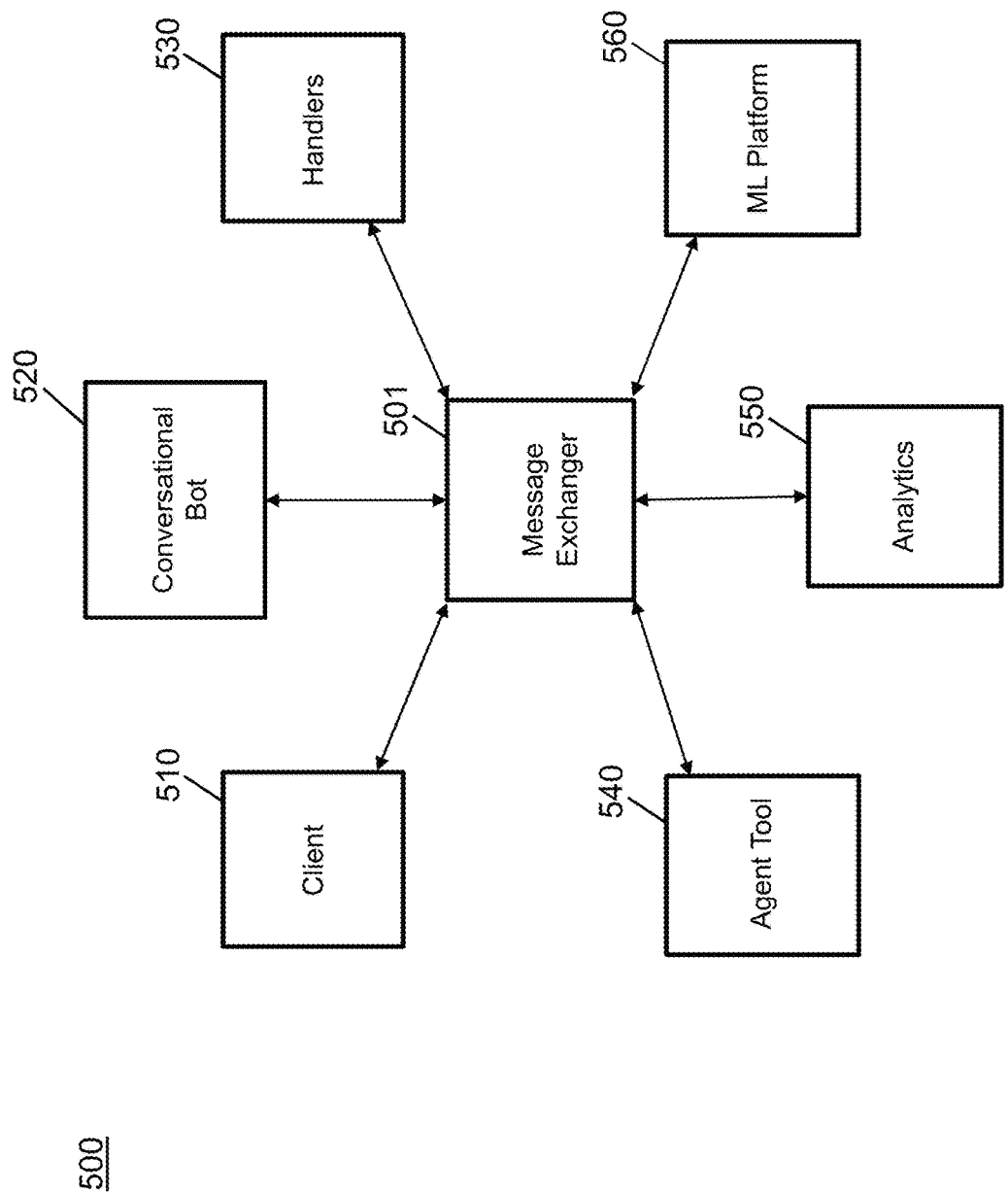
FIG. 5 is a block diagram illustrating interactions between a message exchanger and other components of a communication system, in accordance with some embodiments of the present teaching.

FIG. 5 is a block diagram illustrating interactions between a message exchanger 501 and other components of a communication system 500, in accordance with some embodiments of the present teaching. In some embodiments, the message exchanger 501 may be implemented as the message exchanger 350 in FIG. 3 and FIG. 4. As shown in FIG. 5, the message exchanger 501 can interact with a client 510, a conversational bot 520, one or more handlers 530, an agent tool 540, one or more analytics 550, and a machine-learning (ML) platform 560.

In some embodiments, asynchronous clients and/or devices 510 of a user can talk to the message exchanger 501, instead of talking directly to the conversational bot 520. Linked devices that are not actively interacting with the user, can also receive message, push notifications, and/or commands from the message exchanger 501. The message exchanger 501 can orchestrate the handoff to the agent tool 540 and handoff back to the conversational bot 520. Depending on the agent integration, the message exchanger 501 can play intermediary between the user and the agent tool 540. The agent tool 540 can also store the offline chat data for the conversational bot 520 to consume retroactively.

In some embodiments, the message exchanger 501 becomes a default client with respect to the conversational bot 520 for all asynchronous use cases. The conversational bot 520 consumes offline chat between agent and the user from the message exchanger 501. The conversational bot 520 may put annotated conversation data and possibly logs into the message exchanger 501. The handlers 530 can choose to route and multi-cast asynchronous responses through the outgoing queue of the message exchanger 501. The consumers can subscribe to streaming conversation logs and conversation turns to pipe the data into a persistent store or dashboard for batch or real-time analytics 550.

In some embodiments, the machine-learning (ML) platform 560 may be either integrated to the message exchanger 501, or implemented in a separate device like the web server 104, to process conversational data and/or analytics 550 based on ML models. The ML models can tap into the live streaming conversation turns beyond what context time-to-live (TTL) allows.

Figure 6:
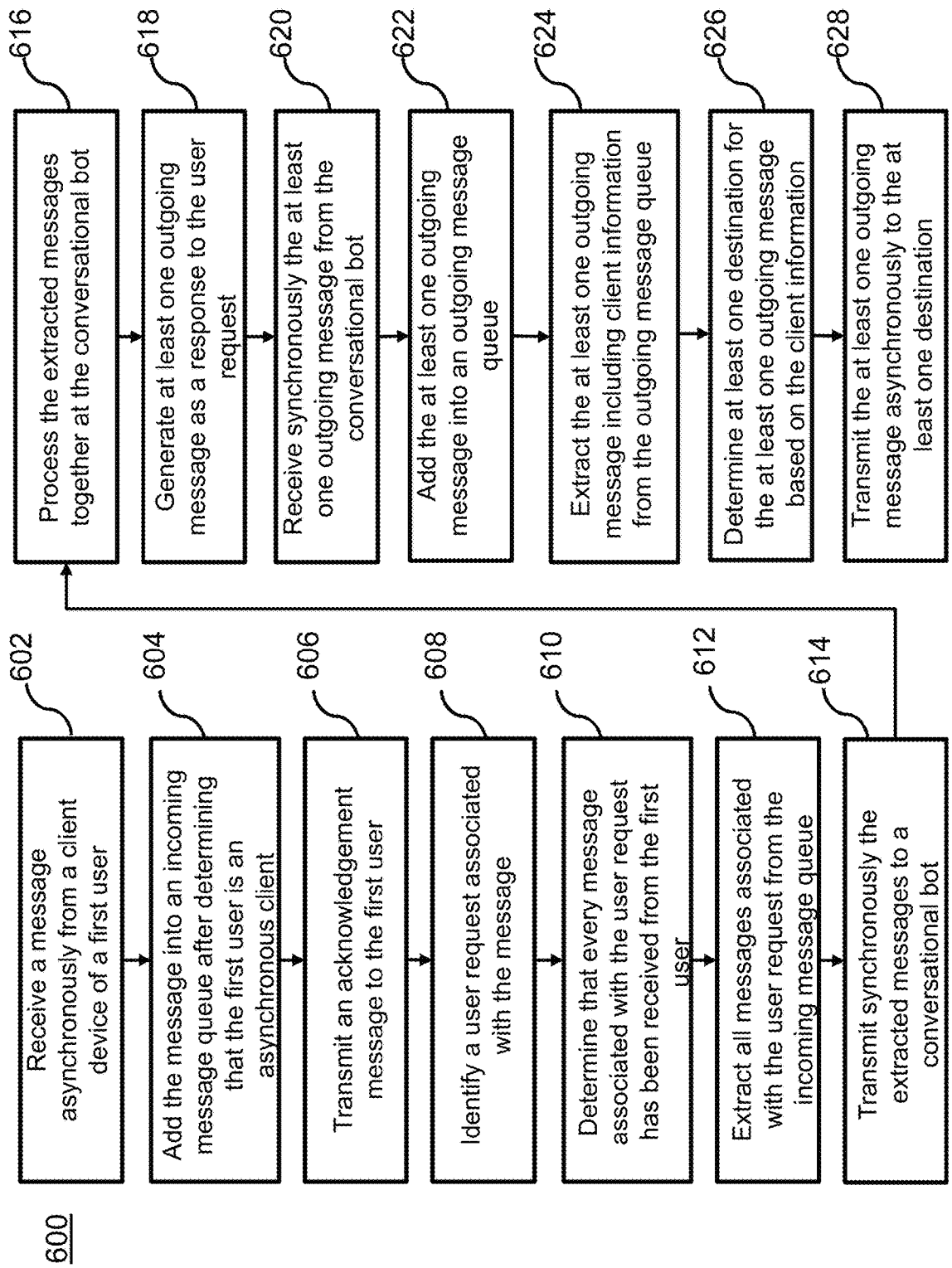
FIG. 6 is a flowchart of an exemplary method for exchanging asynchronous messages to facilitate online automated conversations, in accordance with some embodiments of the present teaching.

FIG. 6 is a flowchart of an exemplary method 600, which can be carried out by the asynchronous conversational computing device 102 of FIG. 1, for exchanging asynchronous messages to facilitate online automated conversations, in accordance with some embodiments of the present teaching. At operation 602, a message is received asynchronously from a client device of a first user. The message is added at operation 604 into an incoming message queue after determining that the first user is an asynchronous client. At operation 606, an acknowledgement message is transmitted to the first user. At operation 608, a user request associated with the message is identified. At operation 610, it is determined that every message associated with the user request has been received from the first user. At operation 612, all messages associated with the user request are extracted from the incoming message queue. At operation 614, the extracted messages are transmitted synchronously to a conversational bot.

At operation 616, the extracted messages are processed together at the conversational bot. At operation 618, at least one outgoing message is generated as a response to the user request. At operation 620, the at least one outgoing message is received synchronously from the conversational bot. At operation 622, the at least one outgoing message is added into an outgoing message queue. At operation 624, the at least one outgoing message including client information is extracted from the outgoing message queue. At operation 626, at least one destination is determined for the at least one outgoing message based on the client information. At operation 628, the at least one outgoing message is transmitted asynchronously to the at least one destination, which may include: the client device of the first user, another client device of the first user, or another client device of a second user. The order of the operations in FIG. 6 can be changed according to different embodiments of the present teaching.

Figure 7:
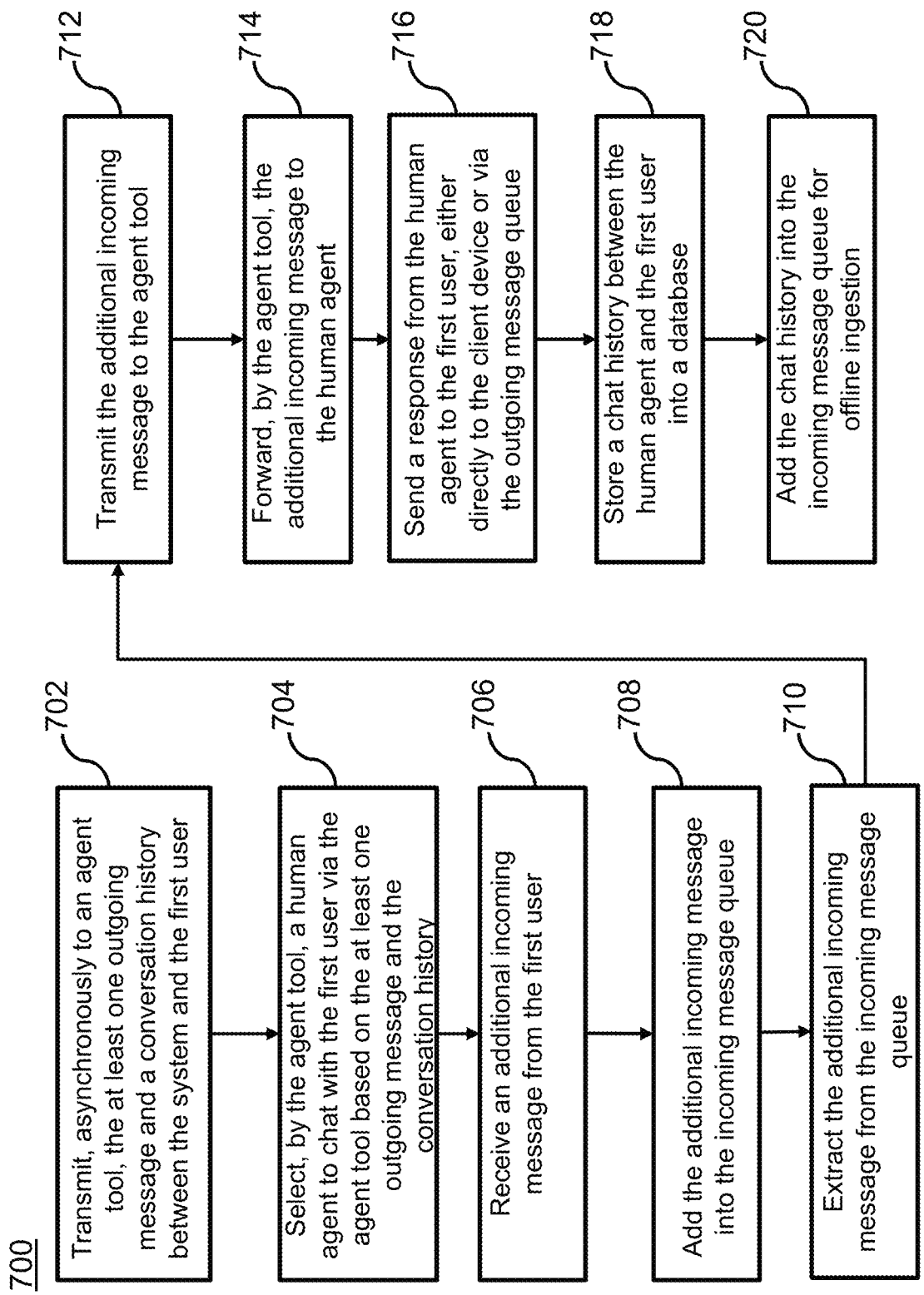
FIG. 7 is a flowchart of an exemplary method for exchanging asynchronous messages to facilitate online agent-client conversations, in accordance with some embodiments of the present teaching.

FIG. 7 is a flowchart of an exemplary method 700, which can be carried out by the asynchronous conversational computing device 102 of FIG. 1, for exchanging asynchronous messages to facilitate online agent-client conversations, in accordance with some embodiments of the present teaching. In some embodiments, the method 700 can be performed after operation 626, where the at least one destination for the at least one outgoing message is determined to be an agent tool. At operation 702, the at least one outgoing message and a conversation history between the system and the first user, can be transmitted asynchronously to the agent tool. At operation 704, a human agent is selected by the agent tool to chat with the first user via the agent tool based on the at least one outgoing message and the conversation history. At operation 706, an additional incoming message is received from the first user. At operation 708, the additional incoming message is added into the incoming message queue. At operation 710, the additional incoming message is extracted from the incoming message queue. At operation 712, the additional incoming message is transmitted to the agent tool. At operation 714, the additional incoming message is forwarded by the agent tool to the selected human agent. At operation 716, a response is sent from the human agent to the first user, either directly to the client device or via the outgoing message queue. At operation 718, a chat history between the human agent and the first user is stored into a database. Optionally at operation 720, the chat history is added into the incoming message queue for offline ingestion. The order of the operations in FIG. 7 can be changed according to different embodiments of the present teaching.

Figure 8:
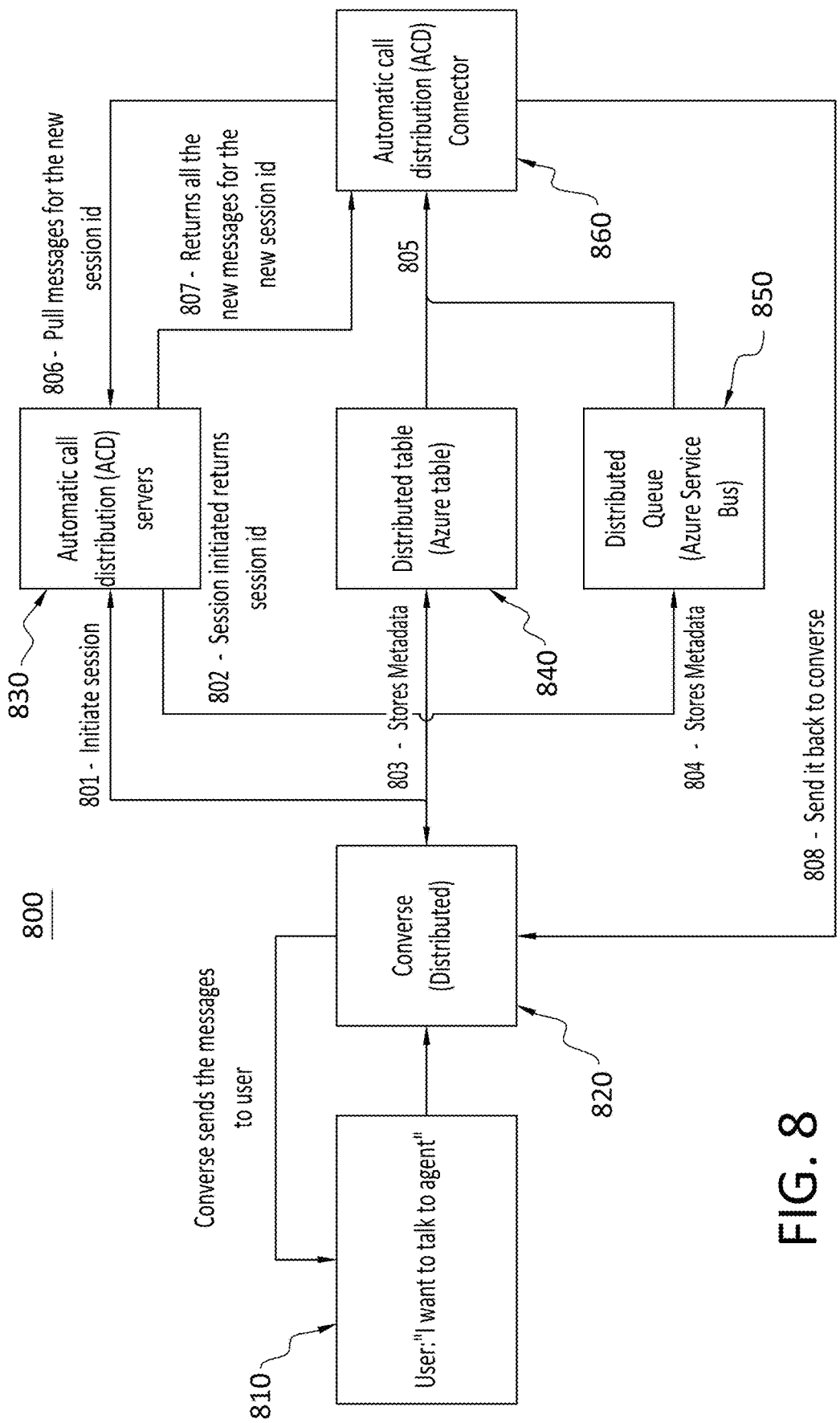
FIG. 8 illustrates a flow chart of a method, according to another embodiment.

Turning ahead in the drawings, FIG. 8 illustrates a flow chart of a method 800, according to another embodiment. In some embodiments, method 800 can be a method of automatically connecting users to live agents using a chat bot via an automatic call distribution (ACD) connector. Method 800 is merely exemplary and is not limited to the embodiments presented herein. Method 800 can be employed in many different embodiments and/or examples not specifically depicted or described herein. In some embodiments, the procedures, the processes, and/or the operations of method 800 can be performed in the order presented. In other embodiments, the procedures, the processes, and/or the operations of method 800 can be performed in any suitable order. In still other embodiments, one or more of the procedures, the processes, and/or the operations of method 800 can be combined or skipped.

In these or other embodiments, one or more of the operations of method 800 can be implemented as one or more computing instructions configured to run at one or more processors and configured to be stored at one or more non-transitory computer-readable media. Such non-transitory computer-readable media can be part of a computer system, such as the systems shown in FIG. 8 and/or communication system 100 (FIG. 1). The processor(s) can be similar or identical to the processor(s) described above with respect to computing device 200 (FIG. 2).

In many embodiments, method 800 can be performed by a chat bot 820, an automatic call distribution (ACD) server 830, a distributed table 840, a distributed queue 850, and/or an automatic call distribution (ACD) connector 860. In many embodiments, the systems that perform method 800 can be modules of computing instructions (e.g., software modules) stored at non-transitory computer readable media that operate on one or more processors. In other embodiments, these systems can be implemented in hardware.

Figure 10:
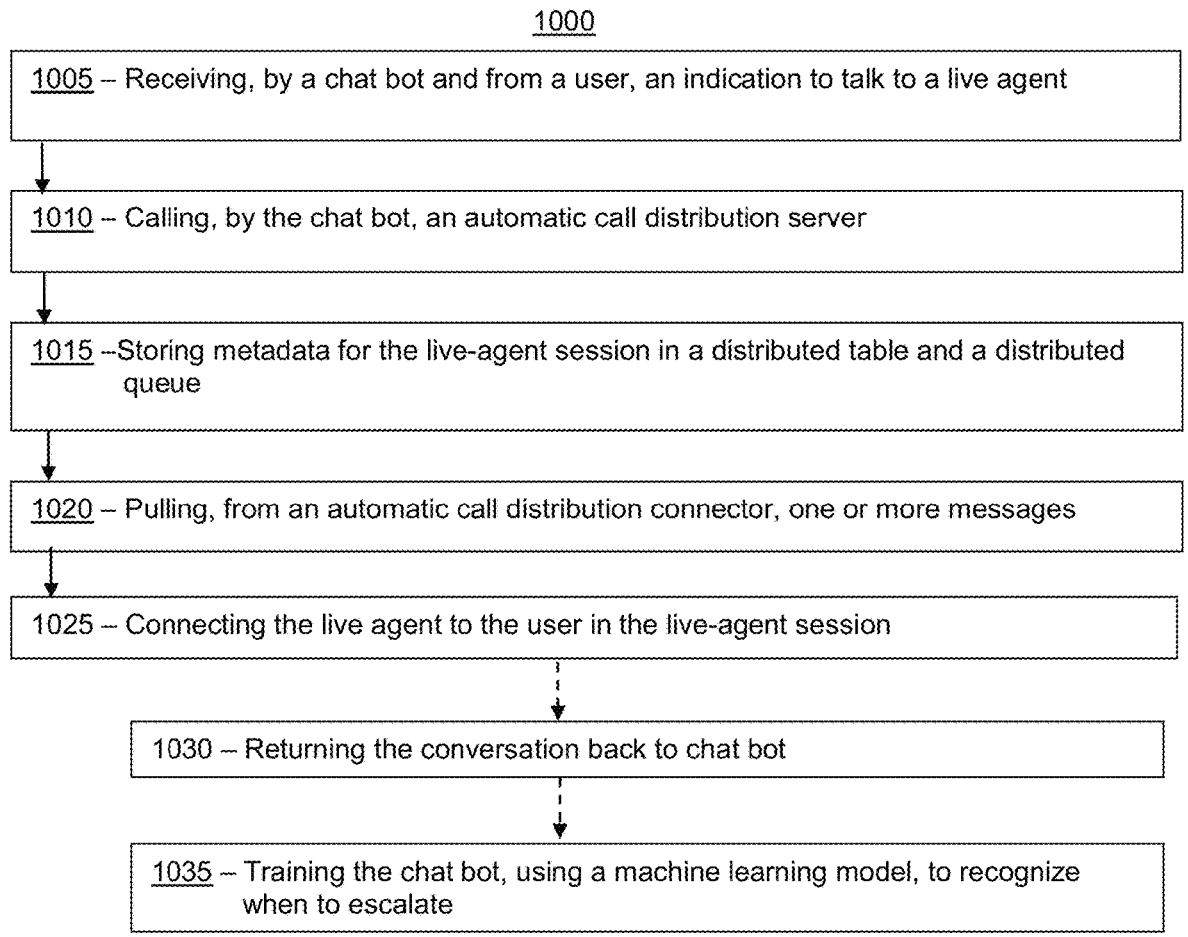
FIG. 10 is a flow chart of a method, according to an embodiment.

In several embodiments, method 800 can include an operation 801 of chat bot 820 initiating a live-agent session using ACD server 830. In some embodiments, chat bot 820 can initiate the live-agent session while a user 810 is communicating with chat bot 820. In some embodiments, the user can communicate with chat both 820 through a third-party software application, such as Facebook/Meta Messenger and/or Google Maps. In other embodiments, the user can communicate with chat bot 820 directly or through an e-commerce website provided by a company that also provides the chat bot. For example, chat bot 820 can receive a message from user 810 such as, "I want to talk to agent" while logged into a third party software and connect with chat bot 820 of an online platform, where the online platform unassociated with the third party software application. In other examples, the message from user 810 can less explicitly ask to speak to a live agent, but nonetheless can imply that user 810 desires to speak with a live agent. After receiving the indication from the user that the user desires to talk to a live agent, chat bot 820 can initiate the live-agent session in activity 801. In various embodiments, chat bot 820 can receive and transmit data with user 810, ACD server 830, distributed table 840, and/or ACD connector 860. In various embodiments, method 800 can proceed after operation 801 to an operation 802. In many embodiments, operation 801 can be implemented as described below in connection with operation 1010 (FIG. 10).

In various embodiments, method 800 also can include operation 802 of ACD server 830 assigning each initiated live-agent session with a session identification (ID) and returning the session ID to chat bot 820. In some embodiments, the session ID can include a specific number, an encrypted token, a machine language sequence configured to be read by machine learning models, a custom designed sequence of characters and/or images, a custom designed sequence of characters and/or images configured to expire or be automatically deleted within a period of time and/or another type of session identifier. In several embodiments, method 800 can proceed after operation 802 to an operation 803.

In several embodiments, method 800 additionally can include operation 803 of ACD server 830 storing metadata in distributed table 840 to create one or more links to messages between the user and the chat bot. In many embodiments, such metadata can include session ID, chat bot logs, links, messages, metadata, and/or another suitable type of data. In some embodiments, when subsequent messages are received by chat bot 820 from user 810 after an initial connection to chat bot 820, chat bot 820 can pull and/or update the metadata in distributed table 840 and/or distributed queue 850 to check if there is an on-going live-agent session, and if so, can connect the user to the same live agent. In several embodiments, method 800 can proceed after operation 803 to an operation 804. In some embodiments, operation 803 can be implemented as described below in connection with operation 1015 (FIG. 10).

In a number of embodiments, method 800 further can include operation 804 of ACD server 830 storing metadata in distributed queue 850, which can include the respective session ID. In various embodiments, requests to be connected with a live agent via ACE connector can involve a wait time in distributed queue 850 when live agents are not available for each request at certain point in time. In some embodiments, method 800 can proceed after operation 804 to an operation 805. In several embodiments, operation 804 can be implemented as described below in connection with operation 1015 (FIG. 10).

In some embodiments, method 800 can include operation 805 of ACD connector 860 receiving the metadata from distributed table 840 and/or distributed queue 850 for use in establishing a live-agent session. In several embodiments, when a live agent becomes available, operation 805 can pull the metadata from distributed queue 850 to orchestrate an allocation of a live agent to connect with use 810 in the live-agent session, based on the next session ID in the queue. In many embodiments, method 800 can proceed after operation 805 to an operation 806.

In several embodiments, method 800 can include operation 806 of ACD connector 860 pulling messages for a new session ID from ACD server 830 for use in a live-agent session with a user. In some embodiments, method 800 can proceed after operation 806 to an operation 807. In several embodiments, operation 806 can be implemented as described below in connection with operation 1020 (FIG. 10).

In various embodiments, method 800 can include operation 807 of ACD server 830 returning new messages received connected to a session ID ACD connector 860 for use in the live-agent session with the session ID. In many embodiments, method 800 can proceed after operation 807 to an operation 808. In some embodiments, operation 807 can be implemented as described below in connection with operation 1020 (FIG. 10).

In several embodiments, method 800 can include operation 808 of ACD connector 860 sending data to chat bot 820 after a live-agent session has ended. In some embodiments, after the live-agent session has ended chat bot 820 can (i) send messages to user 810, (ii) respond to subsequent text messages from the user, (iii) respond to subsequent inquiries and/or indication from user, (iv) initiate a new or follow up session based on a new indication from the user using the same session ID previously assigned and redirecting the new session back to the same live agent, and/or another suitable operation. In various embodiments, operation 808 can be implemented as described below in connection with operation 1030 (FIG. 10).

Figure 9:
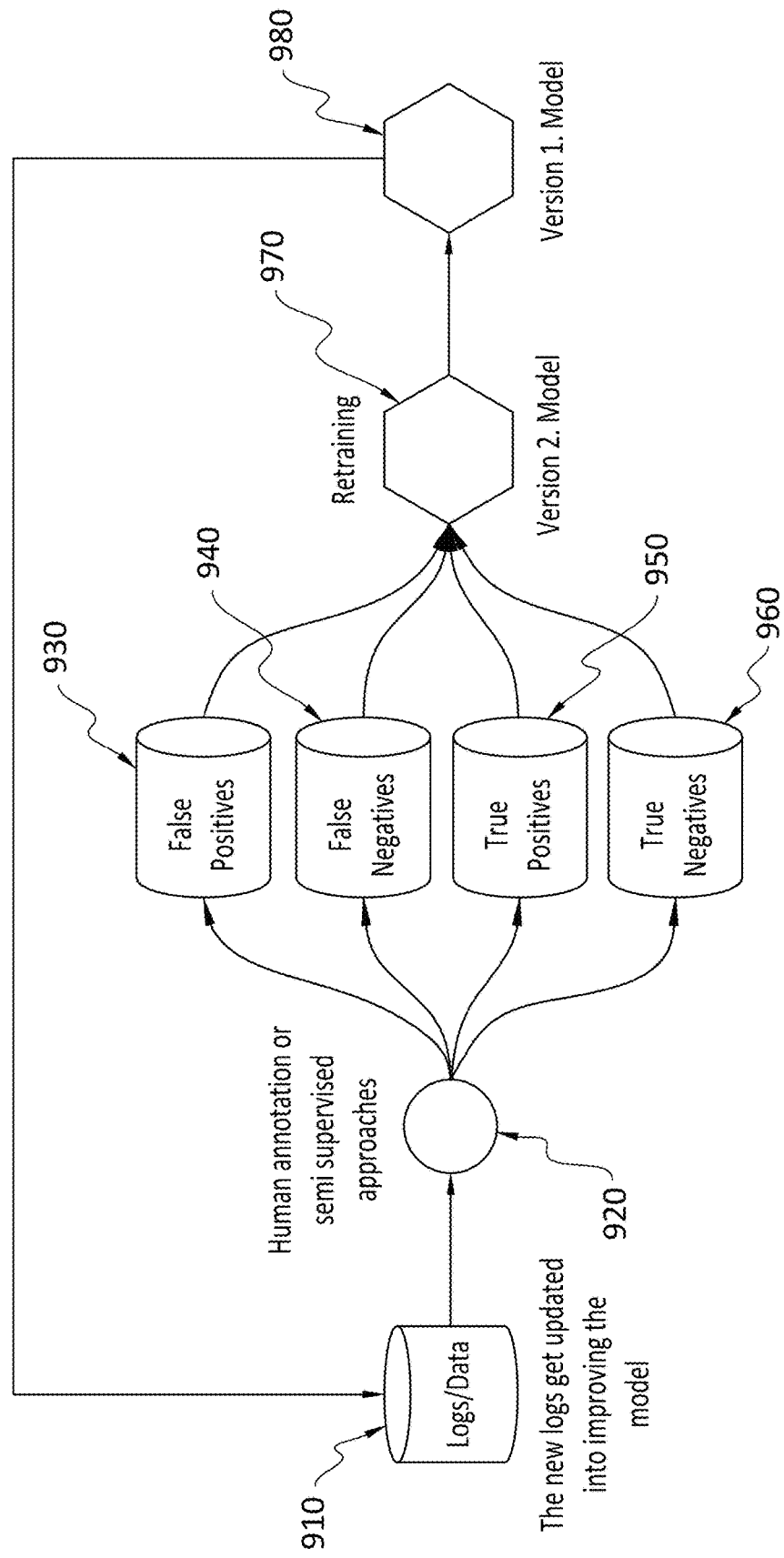
FIG. 9 illustrates a flow chart of a method, according to another embodiment.

Turning ahead in the drawings, FIG. 9 illustrates a flow chart of a method 900, according to another embodiment. In some embodiments, method 900 can be a method of automatically training data for a machine learning model using labelled training data to improve recognition of indications from users to speak to a live agent. In several embodiments, method 900 can include a feedback loop from new chat bot logs to create additional training data. Method 900 is merely exemplary and is not limited to the embodiments presented herein. Method 900 can be employed in many different embodiments and/or examples not specifically depicted or described herein. In some embodiments, the procedures, the processes, and/or the operations of method 900 can be performed in the order presented. In other embodiments, the procedures, the processes, and/or the operations of method 900 can be performed in any suitable order. In still other embodiments, one or more of the procedures, the processes, and/or the operations of method 900 can be combined or skipped. In several embodiments, system shown in FIG. 8 can be suitable to perform method 900 and/or one or more of the operations of method 900. In various embodiments, method 900 can be implemented as described below in connection with operation 1035 (FIG. 10).

In these or other embodiments, one or more of the operations of method 900 can be implemented as one or more computing instructions configured to run at one or more processors and configured to be stored at one or more non-transitory computer-readable media. Such non-transitory computer-readable media can be part of a computer system such as the systems shown in FIG. 8 and/or communication system 100 (FIG. 1). The processor(s) can be similar or identical to the processor(s) described above with respect to computing device 200 (FIG. 2).

Referring to FIG. 9, method 900 can include an operation 910 of receiving new chat bot logs and metadata to update the current training data for the machine learning model. These logs can be based on predictions done by the machine learning model based on a first version 980 of the machine learning model. In some embodiments, each chat bot conversation can be stored as a chat bot log with a user or based on a session ID. In several embodiments, operation 910 can include receiving retrained data from the first version 980 on a periodic basis improving the accuracy of recognizing an intent or indication received from a user to escalate the user to a live agent. In some embodiments, method 900 can proceed after operation 910 to an operation 920.

In various embodiments, method 900 can include an operation 920 of a human labelling as true/false positives/negatives recognitions of indications to escalate a conversation received by a user based on historical chat bot logs.

In several embodiments, chat bot logs can be broken down into a training pairs (message, intent), where each training pair can fall into one of four subsets of indications, such as a false positive indication 930, a false negative indication 940, a true positive indication 950, and/or a true negative indication 960. In some embodiments, operation 920 can use an unsupervised machine learning approach to determine which label to assign a training pair among the four subsets of indications. Similarly, in several embodiments, operation 920 also can use a semi supervised machine learning approach to determine which label to assign a training pair among the four subsets of indications. In various embodiments, method 900 can proceed after operation 920 to one of operation 970.

In some embodiments, method 900 can include operation 970 of retraining the chat bot with the updated training data stored in 930-960, to recognize the correct intent or indication of the user and to connect the user to a live agent based on the training pairs, as labelled. In several embodiments, the retrained or updated data for the training data can be stored in a second version of the model, which can update first version 980, creating a feedback loop Turning ahead in the drawings, FIG. 10 illustrates a flow chart of a method 1000, according to another embodiment. In some embodiments, method 1000 can be a method of automatically enabling a user to escalate an existing conversation with a chat bot to connect to a live agent. Method 1000 can also be a method of allowing multiple users to talk to the same agent asynchronously. Method 1000 is merely exemplary and is not limited to the embodiments presented herein. Method 1000 can be employed in many different embodiments and/or examples not specifically depicted or described herein. In some embodiments, the procedures, the processes, and/or the operations of method 1000 can be performed in the order presented. In other embodiments, the procedures, the processes, and/or the operations of method 1000 can be performed in any suitable order. In still other embodiments, one or more of the procedures, the processes, and/or the operations of method 1000 can be combined or skipped. In several embodiments, the system of FIG. 8 can be suitable to perform method 1000 and/or one or more of the operations of method 1000.

In these or other embodiments, one or more of the operations of method 1000 can be implemented as one or more computing instructions configured to run at one or more processors and configured to be stored at one or more non-transitory computer-readable media. Such non-transitory computer-readable media can be part of a computer system such as column generation engine 310 and/or web server 320. The processor(s) can be similar or identical to the processor(s) described above with respect to computer system 100 (FIG. 1).

Referring to FIG. 10, method 1000 can include an operation 1005 of receiving, by a chat bot and from a user, an indication to talk to a live agent. The chat bot can be similar or identical to chat bot 820 (FIG. 8). The user can be similar or identical to user 810 (FIG. 8). In several embodiments, operation 1005 also can include the user using the interface for the chat bot through a third party software application. In various embodiments, agent escalations also can be configured on a store identification, a store timing, a low customer satisfaction score (CSAT), a user repeating a question to the chat bot in a loop. CSAT score can be one of the configuration parameters based on which a particular configuration can be escalated. In some embodiments, a CSAT score can be calculated for a conversation flow to escalate the configuration if the chat bot detects that the CSAT score of an ongoing conversation with a user is falling below a certain threshold.

In various embodiments, method 1000 further can include an operation 1010 of calling, by the chat bot, an automatic call distribution server to initiate a live-agent session for the user. The automatic chat distribution server can be similar or identical to ACD server 830 (FIG. 8). In some embodiments, the live agent can talk to multiple users in multiple live-agent sessions asynchronously. In several embodiments, the multiple live-agent sessions can include the live-agent session. In some embodiments, the multiple users include the user. In some embodiments, the automatic call distribution server can initiate the live-agent session by assigning an identification to the live-agent session to track the metadata.

In a number of embodiments, method 1000 additionally can include an operation 1015 of storing metadata for the live-agent session in a distributed table and a distributed queue. The distributed table can be similar or identical to distribute table 840 (FIG. 8). The distributed queue can be similar or identical to distributed queue 850 (FIG. 8). In several embodiments, operation 1015 also can include creating one or more links to the one or more messages between the chat bot and the user. In many embodiments, operation 1015 can include adding the requests to the distributed queue to wait for the allocation of the live agent to connect with the user via the live-agent session.

In various embodiments, method 1000 also can include an operation 1020 of pulling, from an automatic call distribution connector, one or more messages from a conversation between the user and the chat bot based on the metadata stored in the distributed table and the distributed queue. Automatic call distribution connector can be similar or identical to ACD connector 860 (FIG. 8). In some embodiments, operation 1020 can include polling the distributed queue at predetermined time intervals to orchestrate an allocation of the live agent. In various embodiments, the chat bot agent escalation can advantageously provide asynchronous communication between users and live agents by providing a user history to the live agent prior to the start of the live agent session.

In several embodiments, method 1000 further can include an operation 1025 of connecting the live agent to the user in the live-agent session using the automatic call distribution connector. In various embodiments, the user can communicate with the live agent in the live-agent session through a same interface for the chat bot. In some embodiments, operation 1015 can include sending a request from the automatic call distribution connector to allocate the live agent for the live-agent session.

In a number of embodiments, when the conversation with the live agent ends, method 1000 optionally can include an operation 1030 of returning the conversation back to chat bot to send messages to the user to end the live-agent session.

In various embodiments, method 1000 optionally can include an operation 1035 of training the chat bot, using a machine learning model, to recognize when to escalate the user to the live-agent session based on training data. For example, chat recognizes the intent of a user as agent escalation and then the chat bot connects the user to the live agent. In some embodiments, operation 1035 of training the chat bot can be performed before operations 1005 and/or 1010, and/or can be performed after operations 1025 and/or 1030.

In several embodiments, the machine learning model can include a natural-language understanding (NLU) machine learning model to recognize an intention of a user to escalate to a live agent. In some embodiments, machine learning models that use unsupervised learning can include such machine learning algorithms as k-means, KNN (k-nearest neighbors), hierarchical clusterings, anomaly detection, neural networks, and/or other suitable machine learning algorithms. In various embodiments, machine learning models that use semi-supervised learning can include low-density separation, continuity assumption, cluster assumption, and/or other suitable semi-supervised machine learning models.

In some embodiments, the machine learning model can include a machine learning model used to identify the user conversations with an intention to be connected to a live agent in real time. Such a machine learning model can include Cortex. For example, some exemplary positive training phrases can include the following positive indications for escalation via a message or text message from a user:

"May I speak with a person?"
"I need to connect to customer service."
"How can I email a store?"
"How to reach management?"
"Assistance."
"Agent."
"I still have not talked to anyone yet."
"Rep."
"How do I get a message to management?"
"I need an operator please."
"Supervisor"
"I need to get a hold of anyone at this store, please."
"Who is the store manager for this location of the store?"
"I need a manager of this location to get back to me."
"Associate."
"Store manager."
"Manager"
"I need to ask a human."
"Something other than canned response."
"What is your contact number?"
"Speak to customer service."
"Speak with customer service."
"Corporate."
"Can someone give me a call?"
"Customer service number?"
"Real people."
"I need to speak to someone in the store."
"I need to talk to home office."
"I need to speak with someone."
"Store support."
"There someone I can talk to?"
"I'm calling corporate."
"A phone number to call."
"Need to call headquarters."
"Need to talk to someone."
"Can I call someone?"
"Customer service phone number?"
"Talk to representatives?"
"Person to help me at the customer service."

In several embodiments, operation 1035 also can include training the machine learning model using labelled training data. In some embodiments, the labelled training data can include (i) false negative indications, (ii) false positive indications, (iii) true positive indications, and (iv) true negative indications for escalating users to live-agent sessions. In various machine learning models, operation 1035 can include periodically updating the training data for the machine learning model to learn from the output of the machine learning model and new chat bot logs improving the accuracy of recognition of intentions and indications from the chat bot and the accuracy and timing of connecting the user to a live agent over the previous chat bot logs.

In various embodiments, operation 1035 can include automating the chat bot to respond accurately to a variety of scenarios based on previous chat logs. As an example, a chat log can include a few words or texts in a message "m" and with an intent "i", such as mi, mi+1, mi+2, mi+3 and mi+4, where the user was unsatisfied with the response of the chat bot. In that example, the user asked the chat bot to connect to a live agent. In this example, if the chat bot answered or handled the user query (mi+4) correctly, a request for agent escalation can be avoided and the user very satisfied with the response from the chat bot.

In several embodiments, identifying all or some of the transition points from the chat bot the user can include detecting failure instances where the chat bot response can be improved over a time period. For example, a scenario, where the user is trying a product that is new to the market, thus no updated training data for the new product exists. As an example conversation under this scenario, where m can refer to a message of the user, i can refer to an intention, c can refer to chat bot responses:

User (m,i+1): "I want to buy apple pods"
Chat Bot (c,i+1): "I can get you gala apples"
User (m,i+2): "No, I want to buy apple pods not gala apples
Chat Bot (c,i+2): "I can get you granny smith apples"
User (m,i+3): "No, I don't want fruits, I need to buy apple electronics, apple pods"
Chat Bot (c,i+3): "I can get you apple juicer machine"
User (m,i+4): "Can I talk to an agent/real human"
Chat Bot (c,i+4): "Yes"

In this example, out of millions of chat logs, the chat bot failed to recognize the intentions: (mi+1, mi+2, mi+3). In this case, the chat bot and the machine learning model can be improved to recognize "apple pods" and help a subsequent user next time.

In a number of embodiments, operation 1035 further can include periodically updating the machine learning model based on further labelling of new chat bot logs to create additional training data.

Returning to FIG. 8, in some embodiments, chat bot 820 can at least partially perform operation 801 of initiating a live-agent session using ACD server 830, operation 910 (FIG. 9) of receiving new chat bot logs and metadata to update the current training data for the machine learning model, operation 920 (FIG. 9) of identifying a positive or a negative recognition of an indication to escalate a conversation received by a user based on historical chat bot logs, operation 970 (FIG. 9) of retraining the chat bot to recognize the correct intent or indication of the user and to connect the user to a live agent based on the training pairs, as labelled, operation 1005 (FIG. 10) of receiving, by a chat bot and from a user, an indication to talk to a live agent, operation 1025 (FIG. 10) of connecting the live agent to the user in the live-agent session using the automatic call distribution connector, operation 1030 (FIG. 10) of returning the conversation back to chat bot to send messages to the user to end the live-agent session, and/or operation 1035 of training the chat bot, using a machine learning model, to recognize when to escalate the user to the live-agent session based on training data.

In various embodiments, ACD server 830 can at least partially perform operation 802 of assigning each initiated live-agent session with a session identification (ID) using ACD server 830, and/or operation 1010 (FIG. 10) of calling, by the chat bot, an automatic call distribution server to initiate a live-agent session for the user.

In some embodiments, distributed table 840 can at least partially perform operation 803 of storing metadata received by ACD server 830 and/or chat bot 820 to create one or more links to messages between the user and the chat bot, and/or operation 1015 (FIG. 5) of storing metadata for the live-agent session in a distributed table and a distributed queue.

In several embodiments, distributed queue 850 can at least partially perform operation 804 of storing metadata, received from ACD server 830, in distributed queue 850, In some embodiments, ACD connector 860 can at least partially perform operation 805 of receiving metadata from distributed table 840 and/or distributed queue 850 to ACD connector 860 for use in a live-agent session, operation 806 of pulling messages for a new session ID from ACD server 830 to ACD connector 860 for use in a live-agent session with a user, operation 807 of returning new messages received connected to a session ID from ACD server sent to ACD connector for use in the live-agent session with the session ID, and/or an operation 1020 (FIG. 10) of pulling, from an automatic call distribution connector, one or more messages from a conversation between the user and the chat bot based on the metadata stored in the distributed table and the distributed queue, In some embodiments, an advantage to using a chat bot agent escalation can include enabling the agent escalation system to be scalable by being able to handle large volumes of requests with dropping any messages in middle of a session. Such a large volume of requests can be approximately over a million queries a day.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although automatically generating an agent escalation to a live-agent session from a chat bot to an ACD connector, has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or operations of FIGS. 6-10 may include different procedures, processes, and/or operations and be performed by many different modules, in many different orders, and/or one or more of the procedures, processes, or operations of FIGS. 6-10 may include one or more of the procedures, processes, or operations of another different one of FIGS. 6-10.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform:
receiving, by a chat bot and from a user, an indication to talk to a live agent, wherein the indication comprises a plurality of incoming messages from the user in an asynchronous manner via a computing device;
determining that the user is an asynchronous user based on at least a user identity for the user;
identifying whether each message of the plurality of incoming messages received from the user is associated with a first request from the user;
adding each message associated with the first request received from the user into an incoming message queue;
extracting, from the incoming message queue, each message of the incoming messages associated with the first request from the user;
aggregating, using a message exchanger, each message associated with the first request from the user into aggregated messages; and
transmitting the aggregated messages associated with the first request of the user synchronously to the chat bot;
calling, by the chat bot, an automatic call distribution server to initiate a live-agent session for the user, wherein the automatic call distribution server is configured to initiate multiple live-agent sessions asynchronously multiple users, and wherein the multiple live-agent sessions comprise the live-agent session and the multiple users comprise the user;

storing metadata for the live-agent session in a distributed table and a distributed queue;

pulling, from an automatic call distribution connector, one or more messages from a conversation between the user and the chat bot based on the metadata stored in the distributed table and the distributed queue, wherein the conversation is associated with the first request of the user; and continuing the conversation by connecting the live agent to the user in the live-agent session using the automatic call distribution connector, wherein the user communicates with the live agent in the live-agent session through a same interface for the chat bot.

2. The system of claim 1, wherein the computing instructions, when executed on the one or more processors, further cause the one or more processors to perform:

when the conversation with the live agent ends, returning the conversation back to the chat bot to send messages to the user.

3. The system of claim 1, wherein the user uses the same interface for the chat bot through a third party software application.

4. The system of claim 1, wherein storing the metadata in the distributed queue comprises:

receiving a request from the automatic call distribution connector to allocate the live agent for the live-agent session.

5. The system of claim 1, wherein storing the metadata for the live-agent session in the distributed table comprises:

creating one or more links to the one or more messages between the chat bot and the user.

6. The system of claim 1, wherein storing the metadata in the distributed queue comprises:

adding a request to the distributed queue to wait for an allocation of the live agent to connect with the user via the live-agent session.

7. The system of claim 1, wherein the automatic call distribution server initiates the live-agent session by assigning an identification to the live-agent session to track the metadata.

8. The system of claim 1, wherein pulling from the automatic call distribution connector further comprises:

polling the distributed queue at one or more predetermined time intervals to orchestrate an allocation of the live agent.

9. The system of claim 1, wherein the computing instructions, when executed on the one or more processors, further cause the one or more processors to perform:

training the chat bot, using a machine learning model, to recognize when to escalate the user to the live-agent session based on training data.

10. The system of claim 9, wherein training the chat bot comprises:

training the machine learning model using labeled training data, wherein the labeled training data comprises (i) false negative indications, (ii) false positive indications, (iii) true positive indications, and (iv) true negative indications for escalating users to live-agent sessions; and periodically updating the machine learning model based on further labeling of new chat bot logs to create additional training data.

11. A method being implemented via execution of computing instructions configured to run on one or more processors and stored at one or more non-transitory computer-readable media, the method comprising:

receiving, by a chat bot and from a user, an indication to talk to a live agent, wherein the indication comprises a plurality of incoming messages from the user in an asynchronous manner;

determining that the user is an asynchronous user based on at least a user identity for the user;

identifying whether each message received from the user is associated with a first request from the user;

adding each message received from the user into an incoming message queue;

extracting, from the incoming message queue, each message of the incoming messages associated with the first request from the user;

aggregating, using a message exchanger, each message associated with the first request from the user into aggregated messages; and transmitting the aggregated messages associated with the first request of the user synchronously to the chat bot;

calling, by the chat bot, an automatic call distribution server to initiate a live-agent session for the user, wherein the automatic call distribution server is configured to initiate multiple live-agent sessions asynchronously multiple users, and wherein the multiple live-agent sessions comprise the live-agent session and the multiple users comprise the user;

storing metadata for the live-agent session in a distributed table and a distributed queue;

pulling, from an automatic call distribution connector, one or more messages from a conversation between the user and the chat bot based on the metadata stored in the distributed table and the distributed queue, wherein the conversation is associated with the first request of the user; and continuing the conversation by connecting the live agent to the user in the live-agent session using the automatic call distribution connector, wherein the user communicates with the live agent in the live-agent session through a same interface for the chat bot.

12. The method of claim 11 further comprising:

when the conversation with the live agent ends, returning the conversation back to the chat bot to send messages to the user.

13. The method of claim 11, wherein the user uses the same interface for the chat bot through a third party software application.

14. The method of claim 11, wherein storing the metadata in the distributed queue comprises:

receiving a request from the automatic call distribution connector to allocate the live agent for the live-agent session.

15. The method of claim 11, wherein storing the metadata for the live-agent session in the distributed table comprises:

creating one or more links to the one or more messages between the chat bot and the user.

16. The method of claim 11, wherein storing the metadata in the distributed queue comprises:

adding a request to the distributed queue to wait for an allocation of the live agent to connect with the user via the live-agent session.

17. The method of claim 11, wherein the automatic call distribution server initiates the live-agent session by assigning an identification to the live-agent session to track the metadata.

18. The method of claim 11, wherein pulling from the automatic call distribution connector further comprises:

polling the distributed queue at one or more predetermined time intervals to orchestrate an allocation of the live agent.

19. The method of claim 11, further comprising:
training the chat bot, using a machine learning model, to recognize when to escalate the user to the live-agent session based on training data.

20. The method of claim 19, wherein training the chat bot comprises:
training the machine learning model using labeled training data, wherein the labeled training data comprises (i) false negative indications, (ii) false positive indications, (iii) true positive indications, and (iv) true negative indications for escalating users to live-agent sessions; and
periodically updating the machine learning model based on further labeling of new chat bot logs to create additional training data.

\* \* \* \* \*